United States Patent Office 3,538,103
Patented Nov. 3, 1970

3,538,103
METHOD OF PRODUCING THE ALKALOID SECURININE
Vladimir Ilich Kogan and Valery Dmitrievich Gorbunov, Villar, Moskovskaya oblast, and Boleslav Kazimirovich Rostotsky, Moscow, U.S.S.R., assignors to Vsesojuzny nauchno-issledovatelsky institut lekarstvennykh rasteny, Villar, Moskovskaya oblast, U.S.S.R.
No Drawing. Filed July 2, 1968, Ser. No. 741,889
Claims priority, application U.S.S.R., Aug. 29, 1967, 1,181,099
Int. Cl. C07d 99/04
U.S. Cl. 260—294.3                1 Claim

ABSTRACT OF THE DISCLOSURE

A method for extracting the alkaloid securinine from raw *Securingega suffruticosa* is presented.

---

The present invention relates to a method of producing the alkaloid securinine which has the formula

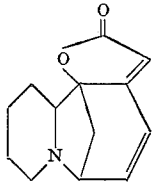

The alkaloid securinine is contained in plants of the spurge family (Euphorbiaceae), e.g. from the herb *Securinega suffruticosa*.

The alkaloid securinine has a strychnine-like effect and is used in medicine for treating motor disorders, including paresis and paralysis after poliomyeolitis, etc.

Now a method of producing the alkaloid securinine is known wherein the raw material (*Securinega suffruticosa*) is extracted with water, the aqueous extract made alkaline with ammonium hydroxide and the alkaloids extracted with chloroform. The alkaloids are extracted from the chloroform solution with sulfuric acid, and after cleaning the sulfuric acid with sodium nitrite and activated charcoal the alkaloids are precipitated with ammonium hydroxide and the product recrystallized from ether and ethyl alcohol.

Disadvantages of the known method are its lengthiness, the low yield and the explosion hazard due to the use of a large amount of ether.

The primary object of the present invention is to reduce the time required for the production process.

Another object of the invention is to improve the quality of the product.

Yet another object of the invention is to eliminate from the production process the use of the explosive solvent, ether.

It has been found that these and other objects of the invention have been accomplished by the provision of a method of producing the alkaloid securinine wherein the raw material, *Securinega suffruticosa*, is extracted with water, the aqueous extract alkalized with ammonium hydroxide, the alkaloids extracted with dichloroethane, the alkaloids extracted from the dichloroethane with sulfuric acid, the sulfuric acid extract treated with sodium nitrite and activated charcoal, the alkaloids precipitated from the sulfuric acid extract by alkalizing with ammonium hydroxide and dissolved in dichloroethane, the dichloroethane solution passed through aluminum oxide and the product recrystallized from dichloroethane.

The present method of producing securinine makes it possible to reduce the time required for the process by approximately one-third, obtain a product of higher quality as indicated by the melting point (135–137° C. instead of 130° C. by the prior art method) and also eliminate the use of the explosive solvent ether in the production process.

For a better understanding of the present invention by those skilled in the art the following example is given by way of illustration.

EXAMPLE 96 kg. of air-dry above ground parts of *Securinega suffruticosa* with a securinine content of 0.065% are extracted with 713 liters of water at a temperature of 18–20° C. The 480 liters of aqueous extract obtained, having a securinine content of 0.0125%, is amde alkaline to pH 8 by the addition of 3–4 liters of 25% ammonium hydroxide with stirring and extracted with 96 liters of dichloroethane. 72 liters of dichloroethane extract are obtained, containing 54.25 g. of securinine. The alkaloids are extracted from the dichloroethane solution with 10% sulfuric acid. 5.35 liters of sulfuric acid extract are obtained with a securinine content of 49.41 g.

To the sulfuric acid extract which has been carefully separated from dichloroethane are added 53.5 g. of activated charcoal and 10.7 g. of sodium nitrite dissolved in a small amount of water. The mixture is let stand 30 min. at a temperature of 20° C. and is then heated on the water bath 25–30 min. to a temperature of 70–75° C., whereupon the hot solution is filtered. The charcoal is washed three times with 100 ml. portions of hot distilled water, the wash waters being added to the sulfuric acid extract.

The purified sulfuric acid extract is alkalized with 25% ammonium hydroxide to pH 8 while cooling to 10–15° C. The precipitate is filtered out, washed with a small amount of distilled water and dried at a temperature of 30–35° C. 119 g. of a mixture of alkaloids is obtained, containing 41 g. of securinine.

The mixture of alkaloids is dissolved in 0.43 litre of dichloroethane and filtered through a 5–7 cm. layer of anhydrous aluminum oxide. The aluminum oxide is washed with a small amount of dichloroethane and the washings are added to the main solution.

The 0.6 liter of dichloroethane solution obtained is evaporated in vacuum at a temperature of 50–60° C. until it begins to crystallize. The residue is thereupon cooled, the crystals filtered out and washed with a small amount of ethanol. There are obtained 56 g. of product, M.P. 135–137° C., containing 40.3 g. of levorotatory securinine.

What is claimed is:
1. A method of producing the alkaloid securinine from raw material obtained from the plant *Securinega suffruticosa* comprising extraction of alkaloids from said raw material with water, alkalization of the aqueous extract with ammonium hydroxide, extraction of the alkaloids from the alkalized aqueous extract with dichloroethane, extraction of the alkaloids from the dichloroethane with sulfuric acid, treatment of the sulfuric acid extract with activated charcoal and sodium nitrite followed by alkalization with ammonium hydroxide, solution of the precipitated alkaloids in dichloroethane, passage of the dichloroethane solution through aluminum oxide and recrystallization of the product from dichloroethane.

References Cited

FOREIGN PATENTS 168,300  2/1965  U.S.S.R.

HENRY R. JILES, Primary Examiner

G. T. TODD, Assistant Examiner

U.S. Cl. X.R.

424—267